(12) United States Patent
Juds

(10) Patent No.: US 6,201,236 B1
(45) Date of Patent: Mar. 13, 2001

(54) DETECTION SYSTEM WITH IMPROVED NOISE TOLERANCE

(75) Inventor: Scott Juds, Seattle, WA (US)

(73) Assignee: Auto Sense Ltd., Las Vegas, NV (US)

( * ) Notice: Subject to any disclaimer, the term of this patent is extended or adjusted under 35 U.S.C. 154(b) by 0 days.

(21) Appl. No.: 09/308,341

(22) PCT Filed: Nov. 13, 1997

(86) PCT No.: PCT/US97/20637

§ 371 Date: May 14, 1999

§ 102(e) Date: May 14, 1999

(87) PCT Pub. No.: WO98/21704

PCT Pub. Date: May 22, 1998

(51) Int. Cl.$^7$ ................................................ H01J 40/14
(52) U.S. Cl. ................................ 250/221; 180/274
(58) Field of Search ........................... 250/221, 222.1, 250/341.1, 349; 340/435, 436, 556–557; 180/274

(56) References Cited

U.S. PATENT DOCUMENTS 5,354,983  10/1994  Juds et al. ...................... 250/222.1
5,432,509   7/1995  Kajiwara ............................ 340/903
5,530,322 * 6/1996  Ference et al. ...................... 315/295

FOREIGN PATENT DOCUMENTS 60-89784   5/1985   (JP) ....................................... 340/556

* cited by examiner

Primary Examiner—Que T. Le
(74) Attorney, Agent, or Firm—David A. Greenlee

(57) ABSTRACT

An electro-optical detection system for detecting objects within the boundaries of a monitored zone, comprises a plurality of LED emitter and photodetector pairs. Each emitter (12) emits a beam of pulses of light energy into the monitored zone, and its paired photodetector (14) detects light energy including light energy from the beam that is reflected from an object within the monitored zone and generates light detection signals. A controller (10) operates the emitter and photodetector pairs and evaluates the light detection signals to discriminate between light energy of beams reflected from an object within the monitored zone and other light energy. The controller can selectively adjust the evaluation of the light detection signals to adjust the effective boundaries of the monitored zone.

10 Claims, 10 Drawing Sheets a) LED PULSE
b) AMP RESPONSE
c) GAUSSIAN NOISE
d) NOISE PLUS RESPONSE
e) COMPARITOR

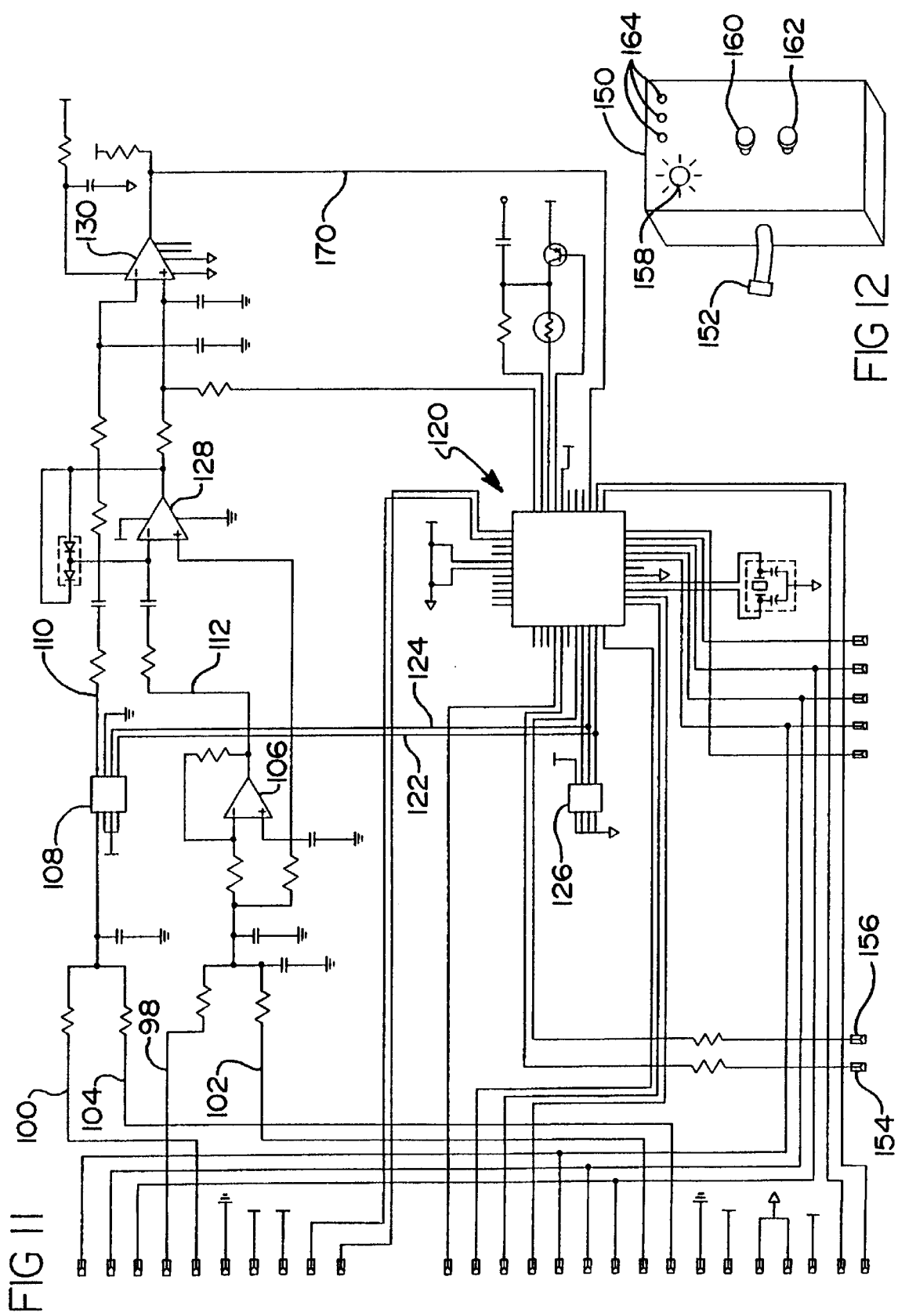

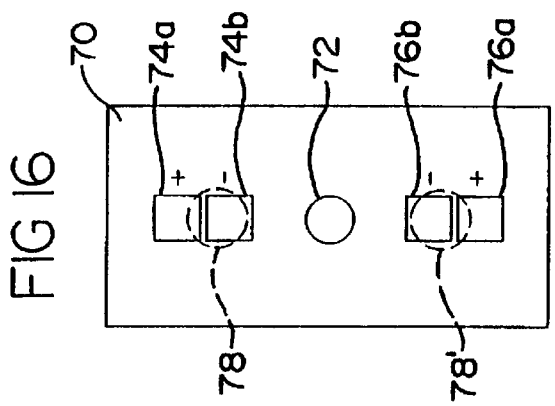
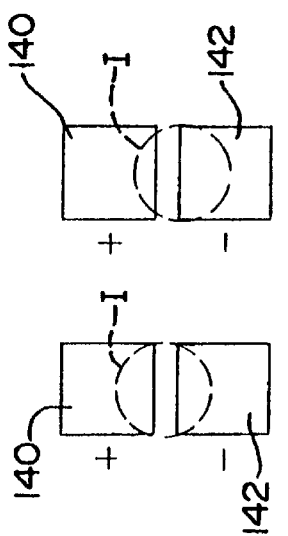
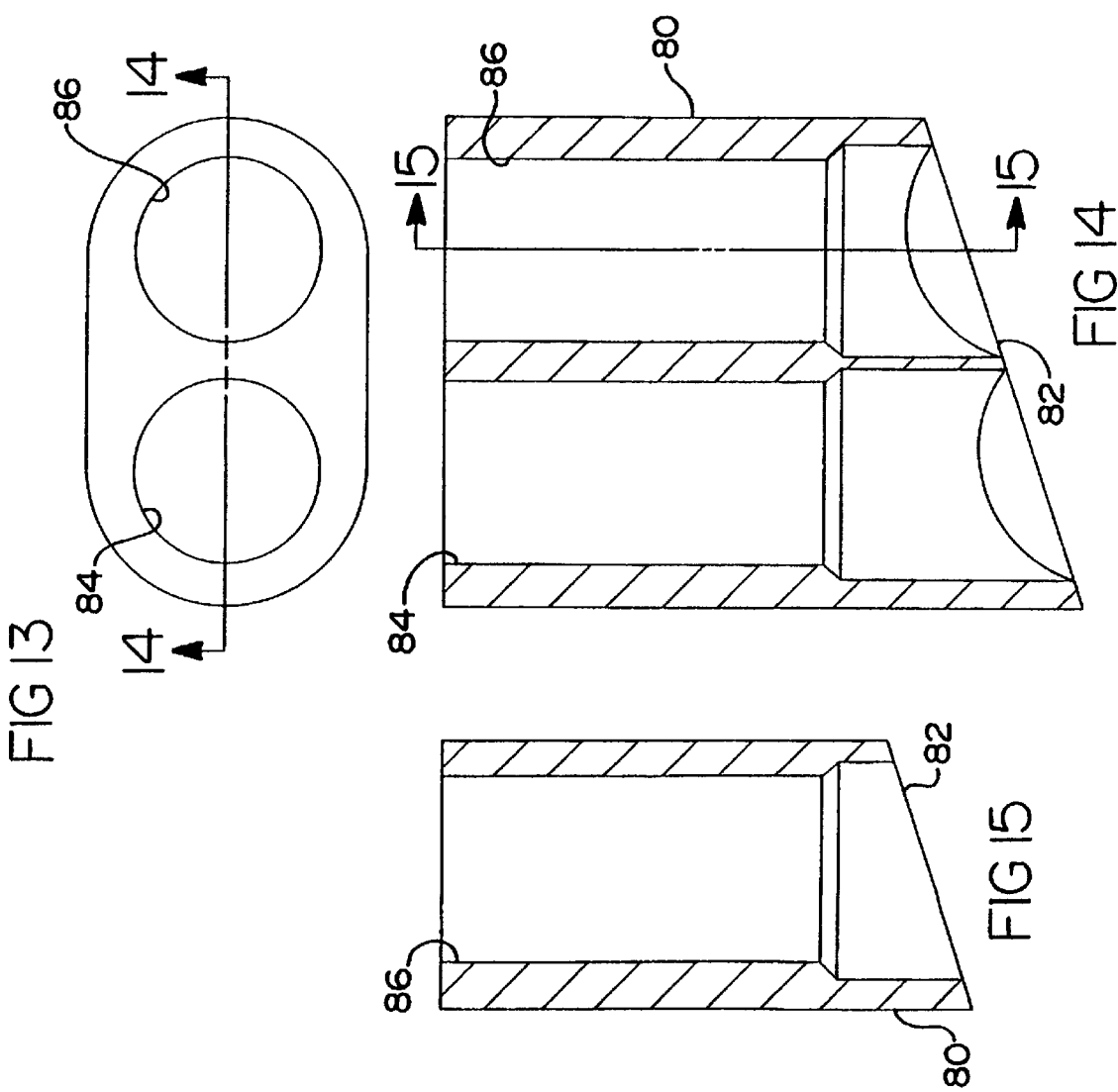
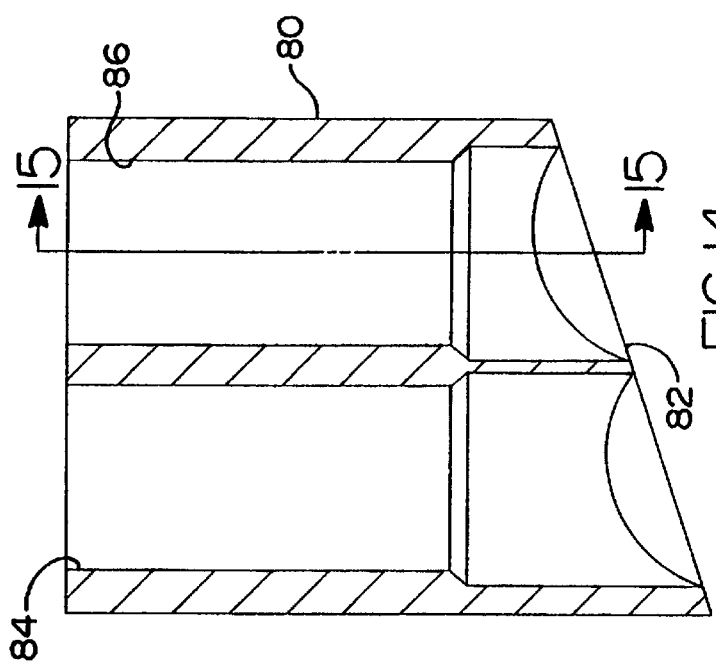
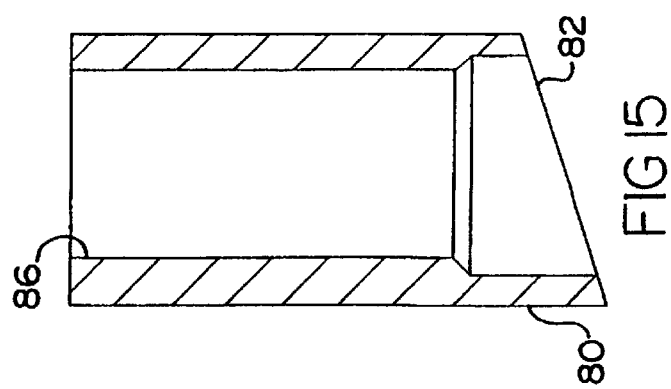

DETECTION SYSTEM WITH IMPROVED NOISE TOLERANCE

FIELD OF THE INVENTION

This invention relates generally to detection systems for detecting the presence of an object in a monitored zone and, more particularly, to an infrared detection system which uses an adaptive threshold pulse detector to improve system tolerance of random noise, and has means to selectively electronically vary the size of the monitored zone.

BACKGROUND OF THE INVENTION

In many known photoelectric synchronous detection systems, a pulsed optical beam signal is transmitted into a volume or zone of space being monitored, typically by using an LED which is activated by a square wave or low duty factor pulse generator/oscillator. An optical photodetector is aimed into the monitored zone with a field of view which includes the pulsed LED beam so that it will receive any reflection of that signal from an object in the zone to detect the presence of the object. Such a system is shown in U.S. Pat. No. 5,463,384—Juds.

To screen out noise and signals from sources other than a reflection of beamed light from the object in the zone, (e.g. from other electrical or optical sources), synchronous receivers are used to operate the receiver only when a reflection of the pulsed signal from an object in the zone is expected. This blocks any response resulting from detection of light energy from other sources during intervals when no reflected pulsed signal is possible.

To reject possible detection of intrinsic random circuit noise and detector shot noise, a fixed detection threshold is imposed on the system at a level above the expected intrinsic random noise levels seen by the detection circuit. This allows the detection circuit to ignore this noise. The probability of false detection due to noise is a function of the threshold level relative to the actual noise level, the amplitude of which is generally a Gaussian distribution.

Other examples of fixed threshold photoelectric detection systems are found in U.S. Pat. Nos. 4,356,393—Fayfield, 4,851,660—Juds, 4,851,661—Everett, Jr., 4,990,895—Juds, and 5,122,796—Beggs et al. Although these fixed threshold synchronous detection systems have been found useful for most photoelectric sensor applications, they are not sufficiently accurate in a situation where high receiver sensitivity is desired in an operating environment having a noise level that is highly inconsistent and randomly variable.

In such an environment, detector system performance is handicapped by the necessity of tailoring detection threshold levels to performing in an environment of the worst expected noise conditions to assure a satisfactory level of noise rejection. This situation exists when the detection system is used for vehicle detection in an outdoors operating environment. Such a system which is used to detect vehicles in a driver's blind spot will encounter a wide variation in noise resulting from ambient light conditions that range from pitch dark nighttime, to 8500 ft-cdls of sunlight reflected from a white surface, to as high as 70,000 ft-cdls of sunlight reflecting from a wet road surface. Since false detects by such systems renders them unreliable to a vehicle driver, elimination of false detects is an important goal.

In a blind spot detection system, the reflectivity of detected target vehicles will vary wildly, as will ambient lighting conditions. Thus, to be effective, such a system will be required to detect vehicles that range in reflectivity from black to white, and in lighting conditions that vary from pitch-dark nighttime to bright sunlight. These detection requirements range in the extreme from a black vehicle at nighttime to a white vehicle in bright sunlight.

In the dark of night very little DC photocurrent is produced in the detectors, resulting in very little shot noise. However, operation in bright daylight will result in quite significant DC current in the receiver photodiodes, resulting in high shot noise levels. The shot noise current produced by DC photocurrent in a silicon photodiode is determined by the equation:

$$i = 5.66 \times 10^{-10} \sqrt{Idc \cdot BW} \text{ Amps RMS}$$

where:
  Idc is the DC photocurrent, and
  BW is the circuit bandwidth in Hz.

When the receiver views a white target vehicle in bright sunlight, the photocurrent generates shot noise which is many times greater than the intrinsic electronic noise of the receiver amplifier itself. To avoid false detection caused by a high level of shot noise, the required threshold must be quite large in comparison the worst case shot noise. This high threshold results in low system capability of detecting very dark, low reflective targets in poor lighting conditions.

There have been several attempts to overcome the operational problems caused by this wide variation in system noise levels. These involve providing the detection system with some form of adaptive adjustment based on a measurement of the noise amplitude characteristics which are then used to set the detection threshold of the receiver. The resulting adaptive threshold receiver optimizes its sensitivity relative to the ambient measured receiver noise to maintain signal reception integrity. Examples of such systems are found in U.S. Pat. Nos. 3,999,083—Bumgardner, 4,142, 116—Hardy et al, 4,992,675—Conner et al, and 5,337, 251—Pastor.

Such systems are quite expensive, since they require the addition of circuitry to continually measure noise, to block such measurement and maintain the prior measurement when an actual signal is detected, and to feed measured levels back to the variable gain stage. This circuitry adds components and assembly labor, thus increasing system size and cost.

There is a need for a detection system which automatically adapts the sensing threshold to changing ambient conditions to achieve optimum sensitivity, low probability of false detections under all ambient noise conditions, and requires no added components.

Vehicle blind spot detector systems such as disclosed in the above-mentioned patents utilize both driver-side and passenger-side detectors. One system comprises sets of six emitter-detector pairs in a module, the detectors being pairs of photodiodes of opposite polarity. The effective range of the system is determined by the geometry of these components. These components are quite small and require very precise manufacturing to maintain their geometry.

These modules also incorporate an emitter-detector pair comprising a so-called "dirty window" detector for determining when a transparent lens cover for the unit is too fouled with contaminants to enable effective vehicle blind spot detection. This emitter-detector pair monitors a portion of the cover that is spaced from the portions of the cover through which the emitter beams and detected reflections travel. The dirty windows detection threshold is dependent on the geometry of the components which are, again, dependent on very precise manufacturing to hold close tolerances.

There is a need for a blind spot detector that incorporates built-in adjustments for selectively varying range of operation and for assuring accurate dirty window detection.

SUMMARY OF THE INVENTION

It is therefore an object of this invention to provide a detection system which automatically adapts the sensing threshold to changing ambient conditions to achieve optimum sensitivity, with a low probability of false detections under all ambient noise conditions, and requires no added components.

It is another object of this invention to provide a blind spot detector that incorporates built-in adjustments for selectively varying its range of operation and for accurately determining when accumulation of contaminants on the detector reduces operability below a predetermined level.

In one aspect, this invention features an electro-optical detection system for detecting objects within a monitored zone, includes an emitter for emitting a beam of pulses of light energy into the monitored zone, a photodetector for detecting light energy including light energy from the beam pulses that is reflected from an object within the monitored zone and for generating light detection signals. A controller for operating the emitter and photodetector and for evaluating the light detection signals to discriminate between valid signals comprising light energy of the beam pulses which is reflected from an object within the monitored zone and invalid signals comprising other light energy and produces an object detection signal. A bandwidth-limited receiver has an adaptive threshold that is inherently controlled by the statistical nature of the receiver noise to optimize sensitivity of the system. A zero threshold detector evaluates the combined noise and pulse response of the bandwidth-limited receiver at one or more spaced points in time which correspond with predetermined points in time when positive or negative peak voltage responses from reflected beam pulses are expected. An up/down counter is employed to count up only if the comparator reports the correct polarity of the expected responses, and to count down for all other responses. The up/down counter is biased to count down in the presence of noise only. The false object detection signal rate in the absence of a valid object detection signal decreases exponentially with the length of the counter.

In one embodiment, the up/down counter counts up one unit for a polarity response expected from a reflected beam pulse and counts down more than one unit for all other responses, whereby an increase in the ratio of the down to up count decreases the probability of producing a false object detection signal. The down to up count ratio of the up/down counter is preferably 3:1.

In another embodiment, the zero threshold detector evaluates the combined noise and pulse response of the bandwidth-limited receiver at two or more spaced points in time which to correspond with points in time when predetermined maximum and minimum voltage peak and flyback responses of opposite polarity from reflected beam pulses are expected. The up/down counter counts up only if the comparator reports the polarity and sequence of the peak and flyback responses expected from a reflected beam pulse, counts down for all other responses, and is inherently biased to count down in the presence of noise only.

In another aspect of this invention, the controller includes programmable range adjustment means for each of the emitter and photodetector pairs which selectively adjusts the evaluation of the light detection signals to adjust the effective boundaries of the monitored zone.

In a further aspect of this invention, the photodetector has a transparent cover, and cover transparency evaluating means are provided which include a special emitter for emitting a special beam of light energy at an angle that assures transmission through the cover at a predetermined spot. A special photodetector is aimed at the spot to receiver light energy reflected from the special beam by contaminants on the cover which reduce cover transparency and to generate a contaminant detection signal to the processing means when a predetermined level of reflected light energy is detected. Adjustment means are provided to selectively vary the amplification of the contaminant detection signal.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 11 is the controller, variable gain amplifier, and detector portions of a schematic circuit diagram of the blind spot detector of this invention:

FIG. 12 is a perspective view of a control unit for controlling the effectiveness of the operating detectors;

FIG. 13 is an enlarged to view of a dirty window detector mounting unit according to this invention;

FIG. 14 is a sectional view taken along line A—A of FIG. 12;

FIG. 15 is a sectional view taken along line B—B of FIG. 13;

FIG. 16 is a diagram of a detection system comprising an emitter LED and opposed pairs of photodiode pairs; and FIGS. 17 and 18 are enlarged plan views of a photodiode pair and different light image patterns.

DETAILED DESCRIPTION OF A PREFERRED EMBODIMENT

Figure 1:
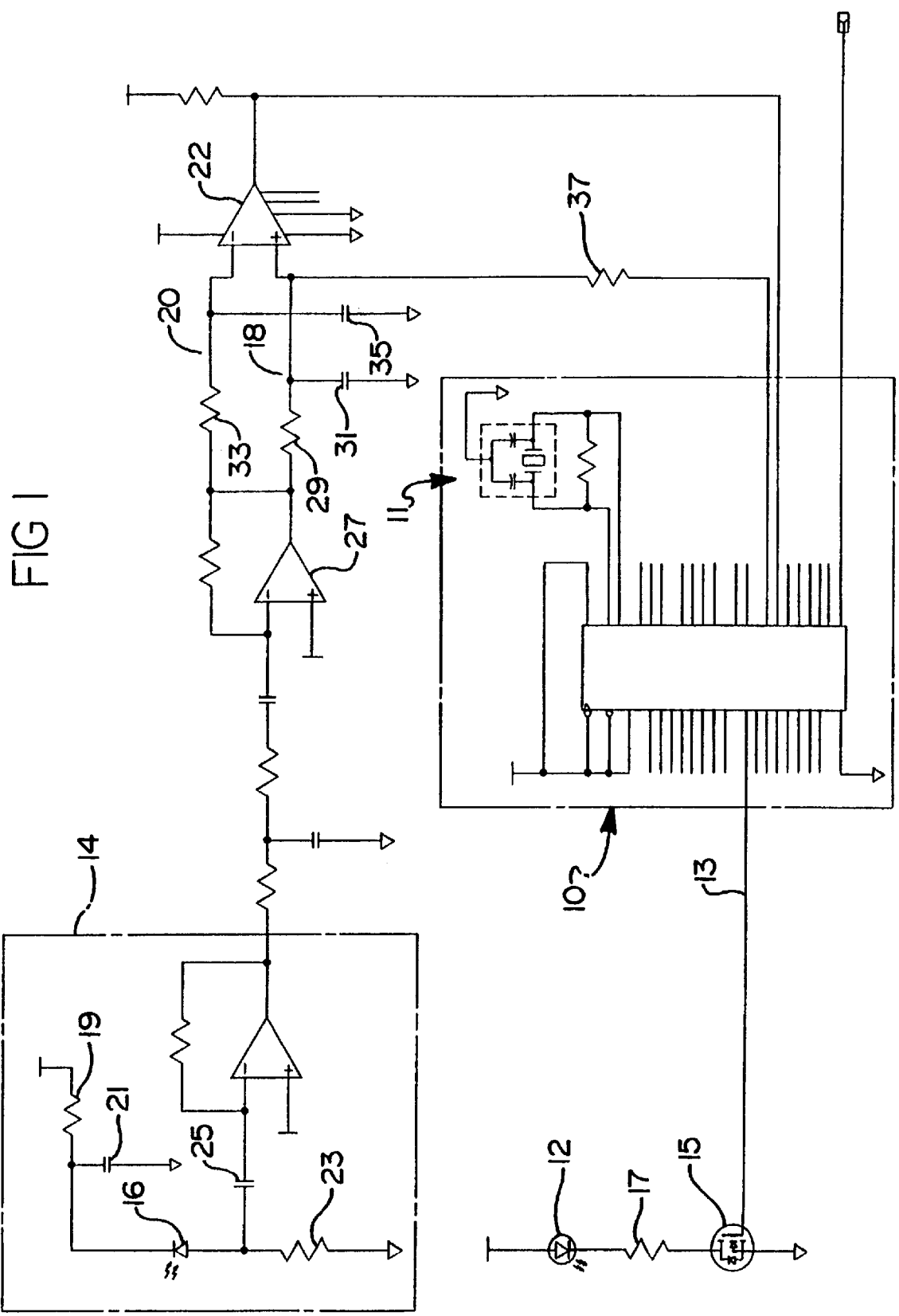
FIG. 1 is a schematic circuit diagram for one emitter-detector unit of a detection system according to this invention.

The circuit of the detection system of this invention is shown in FIG. 1 as comprising a microcontroller 10, which may be a Motorola Model MC68HC05. Microcontroller 10 produces an LED emitter pulse, synchronously detects the state of a receiver, implements an up/down counting detection algorithm, and produces a detect output signal to a visual display, an annunciator, for further processing circuitry. The function of microcontroller 10 could be performed by other microcontrollers, microprocessors, or a fixed array of logic gates.

Microcontroller 10 is clocked by a resonator 11, but is otherwise independently operated by an internal program which controls the sequence of operations, as described below. Microcontroller 10 emits a pulse signal on a line 13 that drives an FET 15 to draw current through resistor 17 and an emitter in the form of an infrared LED 12 to emit a pulse of light energy. LED 12 may be a T-1 ¾ style plastic package Siemens model SFH484 infrared LED, but could be one of many other light sources that are characterized by rapid response such as visible LEDs and laser diodes. LED 12 is aimed to emit beams of pulsed light energy into a predetermined segment of a zone of space being monitored. The pulse is a square wave pulse as shown at a in FIG. 2. The use of a plurality of such LEDs in a vehicle blind spot detector system of this type is fully disclosed in the aforementioned U.S. Pat. No. 5,463,384—Juds, incorporated herein by reference.

A receiver or photodetector detector 14 employs a pair of identical photodiodes (only one of which denoted 16 is illustrated) to detect light energy and has a field of view in the monitored zone of space which includes the beam of light energy emitted by LED 12 to detect light energy of that beam reflected by an object in the monitored zone. Photodiode 16 converts sensed or received light energy into a photocurrent proportional to the intensity of the light energy. One of the photodiodes outputs a positive (+) current signal, while the other photodiode outputs a negative (−) current signal, as will be later detailed. Photodiode 16 may be a T-1 ¾ style plastic package Siemens model SFH203 photodiode or other photodiode or phototransistor which responds rapidly to modulated light pulses. Each LED emitter is paired with a photodetector, comprising the pair of photodiodes. A multiplicity of these emitter-photodiode pairs are utilized to a detection system which monitors a zone, or volume of space, to detect the presence of objects in that zone, as will be later detailed.

A resistor 19 and a capacitor 21 are provided to help assure that photodiode 16 is sufficiently isolated from any high frequency noise that normally rides on the power supply voltage that is used to reverse bias photodiode 16 for photoconductive operation. The photocurrent developed by photodiode 16 in response to sensed light energy passes through and develops a voltage across a resistor 23 that is proportional to the light energy sensed. This includes both reflected pulsed infrared light energy and ambient light. The AC component of the voltage on resistor 23 is coupled through a capacitor 25 and is amplified by an op-amp 27. All op-amps used may be Texas Instruments model TLC272CD or other commercially available general purpose op-amps which meet the gain-bandwidth requirements of the circuit and amplifier noise which is accounted for in the maximum sensitivity calculations for the circuit.

Figure 2:
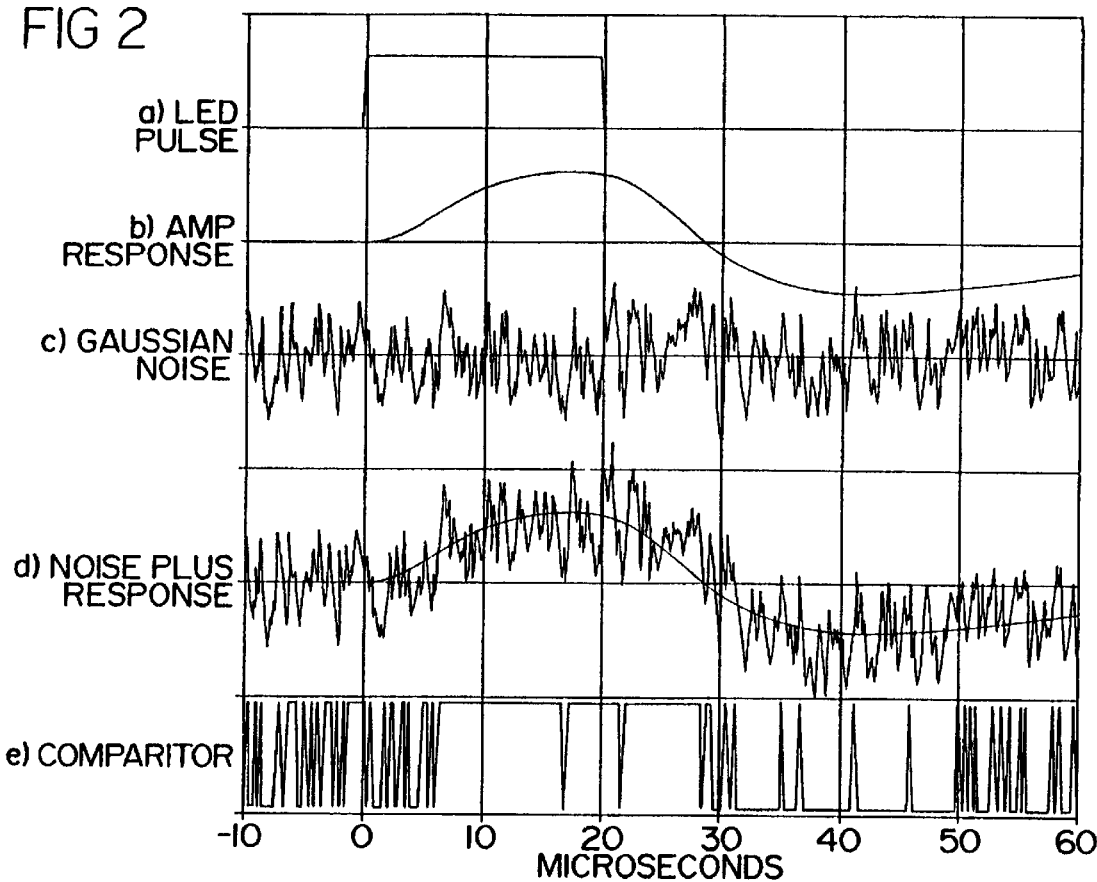
FIG. 2 is graph plotting signal amplitude versus time, illustrating the effects of a pulse, a detected response, Gaussian noise, and the output of a comparator to a combined response and noise detection.

Preferably, the photodetector signal is now bandwidth limited to 5–25 Khz, producing both a pulse response and flyback response as illustrated at b in FIG. 2. The output of op-amp 27 drives a so-called "fast path" 18 through a resistor 29 and a capacitor 31, plus a so-called "slow path" 20 through a resistor 33 and capacitor 35, into input pins of a comparator 22. This self-biases comparator 22 to zero offset and responds only to the high frequency components of the sensed light energy.

Optionally, comparator 22 may be biased by a voltage placed on resistor 37 by the microcontroller to provide a fixed threshold. Comparator 22 may be a National Semiconductor model LM311MA, or any of the many commercially available comparators which satisfy a response time of about 1 µs. The output signal of comparator 22 is fed into microcontroller 10 for processing of the received signal, as shown in FIG. 1.

The signal waveforms illustrated in FIG. 2 progress from the emitted LED square wave pulse a, to the amplifier response b, adding Gaussian noise c, to produce the noise plus response waveform d, and to the output signal e of comparator 22. If there were no noise present in the system, the amplifier response to reception of a reflection of the emitted pulse at the output of op-amp 27 would appear as at b. However, operating systems all inherently include various sources of random noise with a time domain character similar to that depicted at c.

The sources of such random noise include thermal activity of the atoms within a resistor, current passing through a semiconductor junction, and current passing through a resistor. It also includes shot noise in a photodiode produced by ambient light which generates a DC current that passes through the photodiode semiconductor junction. Other sources are found within the resistive and junction components of the op-amp circuits. The response at the output of op-amp 27 will be the arithmetic sum of these noises in combination impressed on the amplifier response to the received reflection of the emitted pulse, as indicated at d.

The output of comparator 22 in response to received signal d will take the form shown as e. It will go high any time d is greater than the long term average value; conversely, it will go low when d is less than the long term average. Examination of the initial 10 µs of e indicates that, absent a pulse response, the comparator output is equally likely to be high or low at any point in time, depending on the random state of the noise. When the pulse response is added and near its peak, in the 10 µs–25 µs period, comparator output is much more likely to be high than low. During the pulse response flyback period, in the 33 µs–47 µs period, comparator output is much more likely to be low than high.

In view of the above, it is clear that a larger amplifier response to reception of a reflected pulse will increase the probability that comparator output will be high during the peak response time period and low during the flyback response period. It has been found that these characteristics of the comparator during peak and flyback response can be usefully employed as the basis of an improved detection algorithm, as will now be described.

Prior art detection algorithms rely on establishing a fixed threshold high enough above the expected noise level to diminish occurrence of false detects. Thresholds are necessary in these systems because, if a detection system with a zero threshold were to sample comparator output at the 20 µs point when no emitted signal reflection were present, a random 50% of samples would be above average value and become false detects. Consider the fix of adding an analog multiplier and integrator where peak response is multiplied by +1 and flyback response is multiplied by −1 and integrated. Since random noise cannot be correlated with the multiplier sign, the resultant system would still result in 50% detection of signals above the threshold, producing false detects, which are highly undesirable.

This invention provides a change in system evaluation methodology, away from the digitized or linear prior art which treats each sample as an independent contributor, to one in which probabilities of the performance of comparator output samples taken at predetermined points of time are used to evaluate these responses in a manner which minimizes the occurrence of false detects, while utilizing a zero threshold. This methodology takes two forms which both utilize a counter to count up, for detections of valid signals which are expected responses from reflections from emitted beams, and count down for all other responses. In digital integrator systems, it is usual to limit the count at upper and lower limits; here, 0 and 15 are used. Only a count up to 15 would produce an object detection signal.

In one form or embodiment, termed the "binomial AND" method, two samples are taken at adjacent points in time when primary peak and flyback responses from a reflected emitter light pulse are expected. In the absence of a valid signal, it produces an inherent bias to count down. In the other form, termed the "single test" method, a single sample is taken at the point in time when a response is expected. The system is programmed with a bias to count down in the absence of a valid pulse reflection signal.

Using the binomial AND test method, the detection system is programmed to sample comparator output c of FIG. 2 at the 20 $\mu$s and 40 $\mu$s time points. Each sample will have two possible states, each with an equal probability of occurrence, since the noise is random. This results in four different states, each having the same probability of occurrence, as shown in Table 1:

TABLE 1

Zero Threshold - Binomial AND Test -
Noise Signal Only

| Test @ 20 $\mu$s | Test @ 40 $\mu$s | Probability | Action |
| --- | --- | --- | --- |
| Low | Low | 25% | Count Down |
| Low | High | 25% | Count Down |
| High | Low | 25% | Count Up |
| High | High | 25% | Count Down |

Although all of the sequences in Table 1 will occur with only noise present, FIG. 2c indicates that, when a reflected signal is present, the High, Low sequence ensues. The other three sequences are considered to be invalid detections. Accordingly, the up/down counter rule is set so that only the High/Low sequence is considered a valid detection and results in a Count Up. Thus, in the absence of a sensed pulse reflection, random noise will bias the up/down count 3:1 toward counting down. It is important to note that the amplitude of the comparator response is irrelevant; it is only the sequences of adjacent response samples that are considered in determining response validity. This enables use of a zero threshold. The inherent count down bias of this system improves the detection reliability by minimizing the probability of producing a false or invalid object detection signal.

Figure 3:
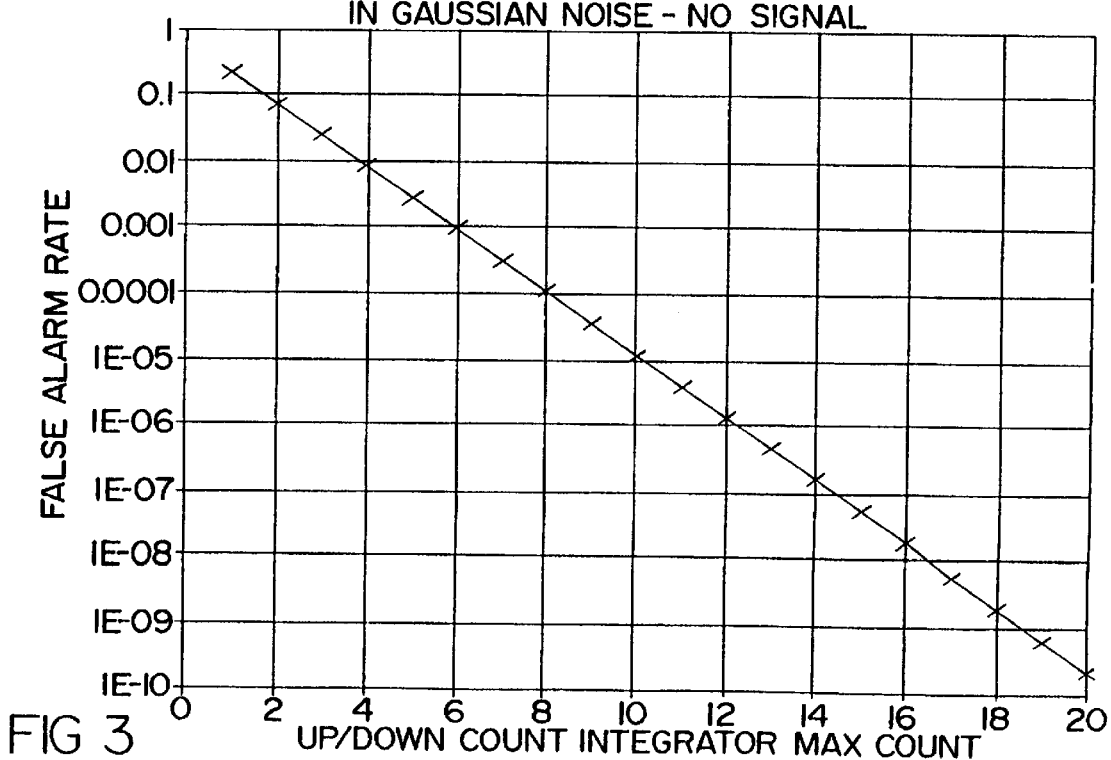
FIG. 3 is a chart of plotting the false alarm rate as a function of responses counted by an up/down counter.

The rate of invalid detection, or False Alarm Rate (FAR), is shown in FIG. 3 for a zero threshold, Binomial AND detection system in the presence of Gaussian noise for various count step lengths. The FAR may be calculated directly from the equation:

$$FAR = \left(\frac{2}{3}\right) \cdot \left(\frac{1}{3}\right)^n$$

where $n$=the number of counter steps.

Because the FAR remains constant with increasing noise, it is evident that this detection methodology will not degrade into increasing false detections as a result of increasing ambient noise.

In a noiseless system, the detection threshold may be defined as "the signal level at which the boundary between non-detection and detection is crossed". In a detection system with noise, the detection threshold becomes "the signal level at which the probability of detection at any given moment is 50%". In an up/down counter system in which a sate of detection is declared upon reaching a full up count, and a state of non-detection is declared upon reaching a zero count, the detection threshold would be defined as "the signal level at which the probability of the up/down count being zero is equal to the probability of the count being full". This situation will occur only when the probability of counting up equals the probability of counting down.

Figure 4:
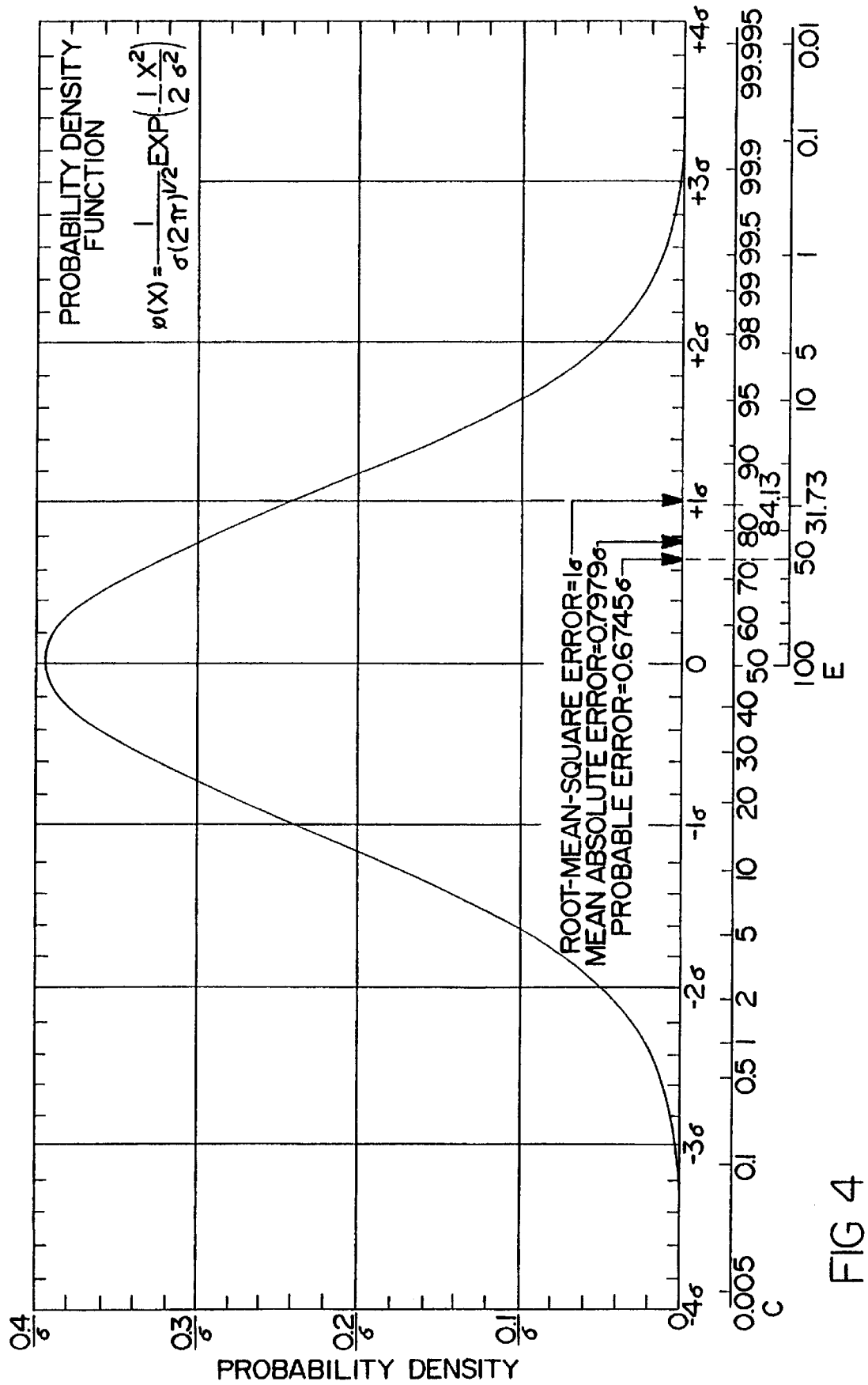
FIG. 4 is a chart showing the probability density function for a random variable with Gaussian statistics.

For this to occur, the comparator response to a received reflected light pulse must offset noise to an extent that the probability of the high/low sample response sequence is 50%. FIG. 4 shows the probability density function for a random variable with Gaussian statistics. The C scale shows the cumulative probability that a given value is below some value. When centered on the probability distribution function, as when no reflected light pulse is sensed, the cumulative probability is 50% that a response value will be low. If a received reflected light pulse which adds an offset to the noise amplitude equal to 1 $\sigma$, the probability that the comparator response will be high is 84.13%, according to FIG. 4.

Figure 5A:
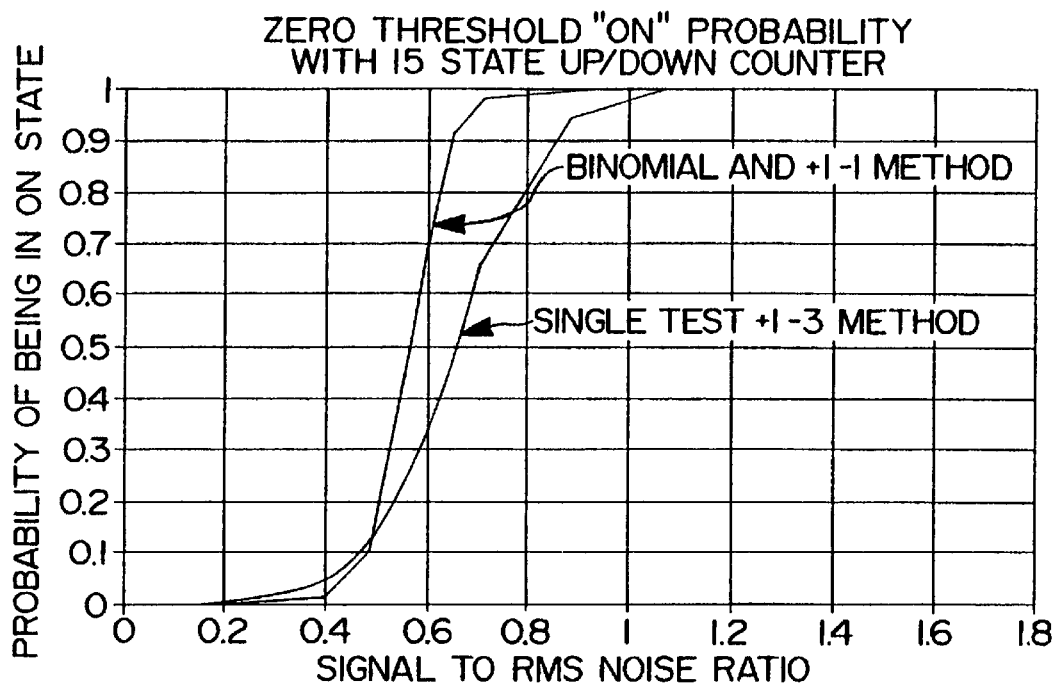
FIG. 5a is a chart showing the probabilities of detection as a function of the signal to noise ratio with a 15 state up/down counter.

Table 2 below defines the probability (probability of a high response=P(1) and probability of a low response=P(0)) at threshold, and shows that the cumulative probability must be 70.71% for each sample of the high/low sequence, for a joint probability of 50%. Implicit in this analysis is the simplifying assumption that the choice of bandwidth limiting frequencies causes the negative flyback response to be substantially similar in magnitude to the positive reflected light pulse response. FIG. 4 indicates that the received signal must offset the noise by 0.57$\sigma$ to achieve a cumulative probability of 70.71%. Therefore, the threshold for this simple up/down counter methodology is 57% of the RMS noise amplitude. By using the FIG. 4 C-scale values, the probability of detection for any signal-to-noise ratio can be derived, as depicted in FIG. 5a which shows a crisp transition between non-detection and detection.

TABLE 2

COMPARATOR OUTPUT PROBABILITY WITH .57$\sigma$ SIGNAL

| Test @ 20 $\mu$s | Test @ 40 $\mu$s | Probability | Action |
| --- | --- | --- | --- |
| P(O) = 29.29% | P(O) = 70.71 | 20.71% | Count Down |
| P(O) = 29.29% | P(1) = 29.29% | 8.58% | Count Down |
| P(1) = 70.71% | P(O) = 70.71% | 50.00% | Count Up |
| P(1) = 70.71% | P(1) = 29.29% | 20.71% | Count Down |

The simple up/down count algorithm illustrated in Tables 1 and 2 and described above is only one of many possible algorithms that bias the count down in the absence of a valid detection signal. Other thresholds can be established by manipulating the up/down count ratios. It is important to understand the necessity of having a bias toward counting down in the absence of a valid detection signal.

Figure 6:
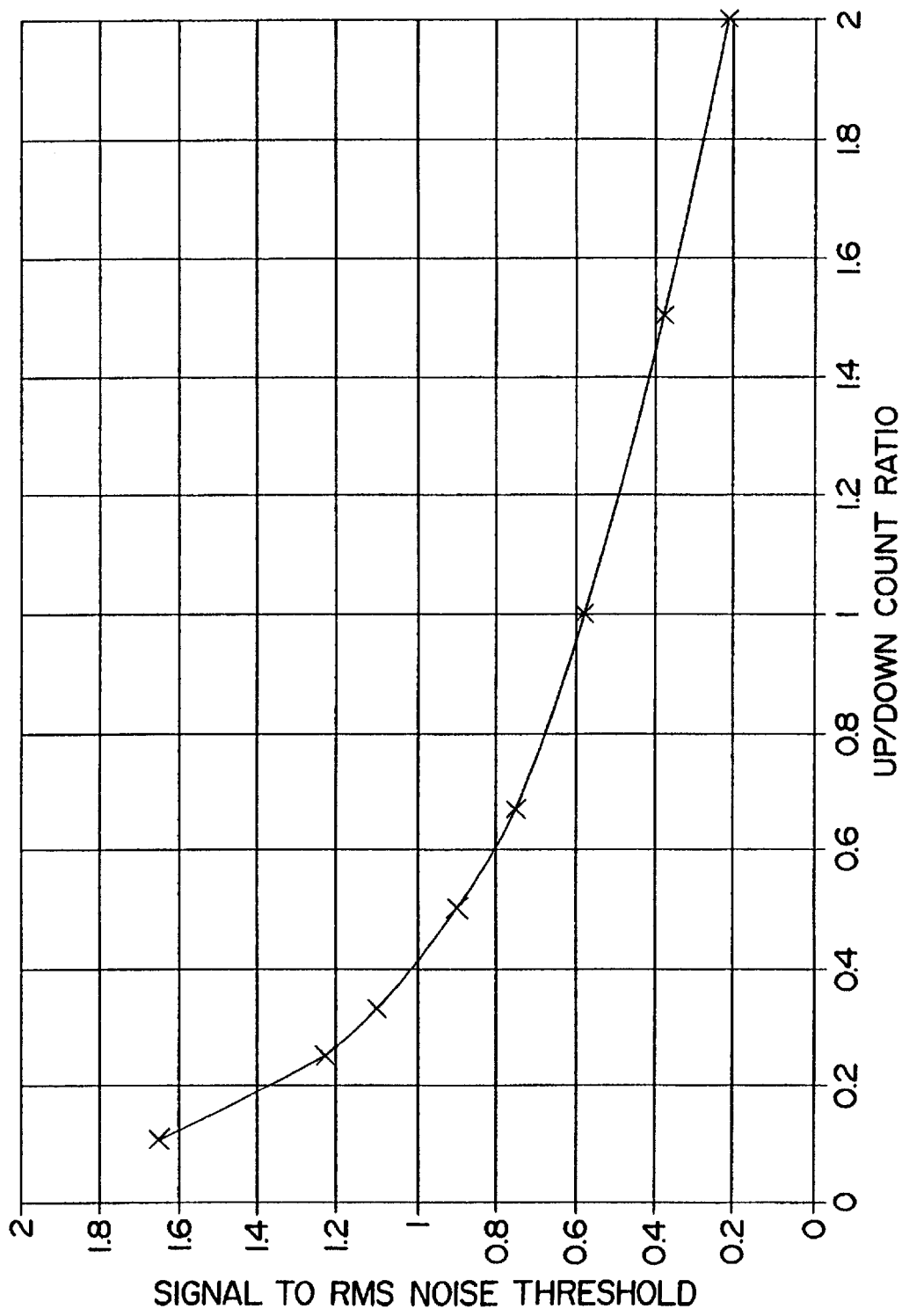
FIG. 6 is a chart showing detection threshold as a function of the up/down counting ratio.

For example, the count could be adjusted to an up count of 2 for a comparator up/down response sequence, with a down count of 1 for all other sequences, resulting in a 3:2 bias toward counting down when only noise is present in the response. This results in a 2:1 up/down counting ratio and a threshold of ≈0.2σ, as shown in FIG. 6. Similarly, an up count of 3 and a down count of 2 results in a 2:1 bias toward counting down and an up/down counting ratio of 1.5:1 with a ≈0.38σ threshold. Changing the up/down counting ratio can be used to change the threshold to implement hysteresis as part of the detection algorithm or as a design choice.

When the single test method is used, the flyback negative response is ignored and only the expected primary peak response, resulting in a (+) output, is sampled. The system is biased to count down to achieve results similar to the binomial AND method. This is achieved by counting up 1 for a (+) signal and counting down 3 for a (−) signal. Since the probability of a (+) count is 0.75 for a 0.71σ output, and 0.25 for a (−) output, the threshold for the single test methodology is 71% of the RMS noise amplitude. The probability of detection for any signal-to-noise ratio is depicted in FIG. 5a.

Figure 5B:
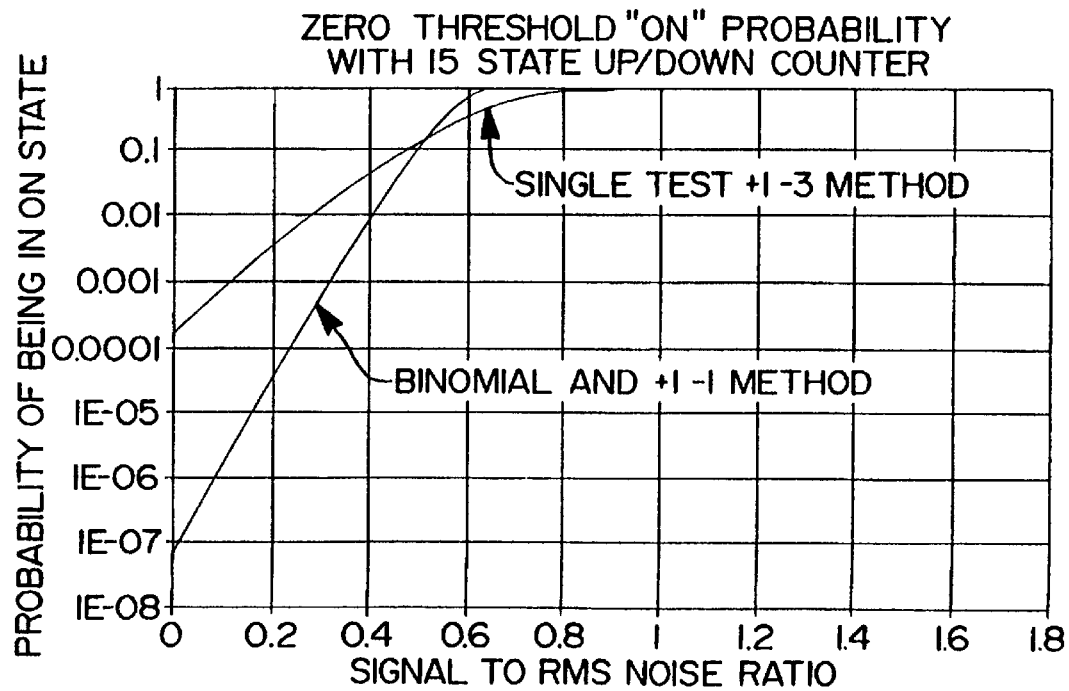
FIG. 5b is a chart similar to FIG. 5a, but using a logarithmic vertical scale to better illustrate false alarm performance.

FIG. 5a shows that both the binomial AND method and the single test method produce similar performances. FIG. 5b plots the same data as FIG. 5a, but on a logarithmic vertical scale, and shows the superior FAR performance of the binomial AND method. Assuming that each pulse sampled is spaced 2 ms apart, then the single test method will statistically produce a false alarm 5 times per minute of operation, while the binomial AND method will produce a false alarm only once every 8 hours. The reason for the superior FAR performance of the binomial AND method relates to the double test of the noise statistics for each pulse sample. Of course, the FAR performance of both systems can be improved by extending the count to more than 15 states.

Certain operating situations will require the detection to utilize maximum sensitivity to prevent other negative side effects. For example, if the major contributor of noise during operation in sunlight is photocurrent-induced shot noise, the absence of this noise source during operation in pitch-dark conditions may cause the threshold to then be controlled by the intrinsic noise of the first amplifier.

There are several avenues available to limit maximum sensitivity of the detection system. Since there is substantial variation in the noise performance of various amplifier designs, the choice of amplifier design is one way to limit the maximum sensitivity of the detection system. Another way is to impose a fixed offset on the comparator input by adding a resistor pulled either high or low, as with resistor 37 in FIG. 1. A fixed offset has the additional advantage of improving the false detection rate when the noise level is small compared to the fixed threshold, while maintaining reasonable insensitivity to noise when noise becomes large compared to the fixed threshold.

Although the detection system has been described with a double sample per pulse period, other sampling techniques could be used. Additional samples could be taken during the peak and flyback response periods, although, to be of added significance, these additional samples must be reasonably uncorrelated with the other samples of the noise.

For example, if the response were sampled at the 12 μs and 22 μs time points in FIG. 2, and with bandwidth limited to 25 Khz, the 10 μs interval between samples would make them highly correlated, and add little significant information to the system. FIG. 2 is illustrated with a noise bandwidth of about 1 Mhz, for which a multiple sample strategy would be effective. However, such a wide bandwidth has several drawbacks. It increases the noise level, thus neutralizing any improvement gained through additional sampling. It also virtually eliminates the reflected pulse negative flyback response and, consequently, the value of even sampling at that time point. Thus, the simplest and most effective design strategy is to minimize noise, reduce bandwidth to shape the comparator response, and sample at two spaced time points, as detailed above.

Figure 7:
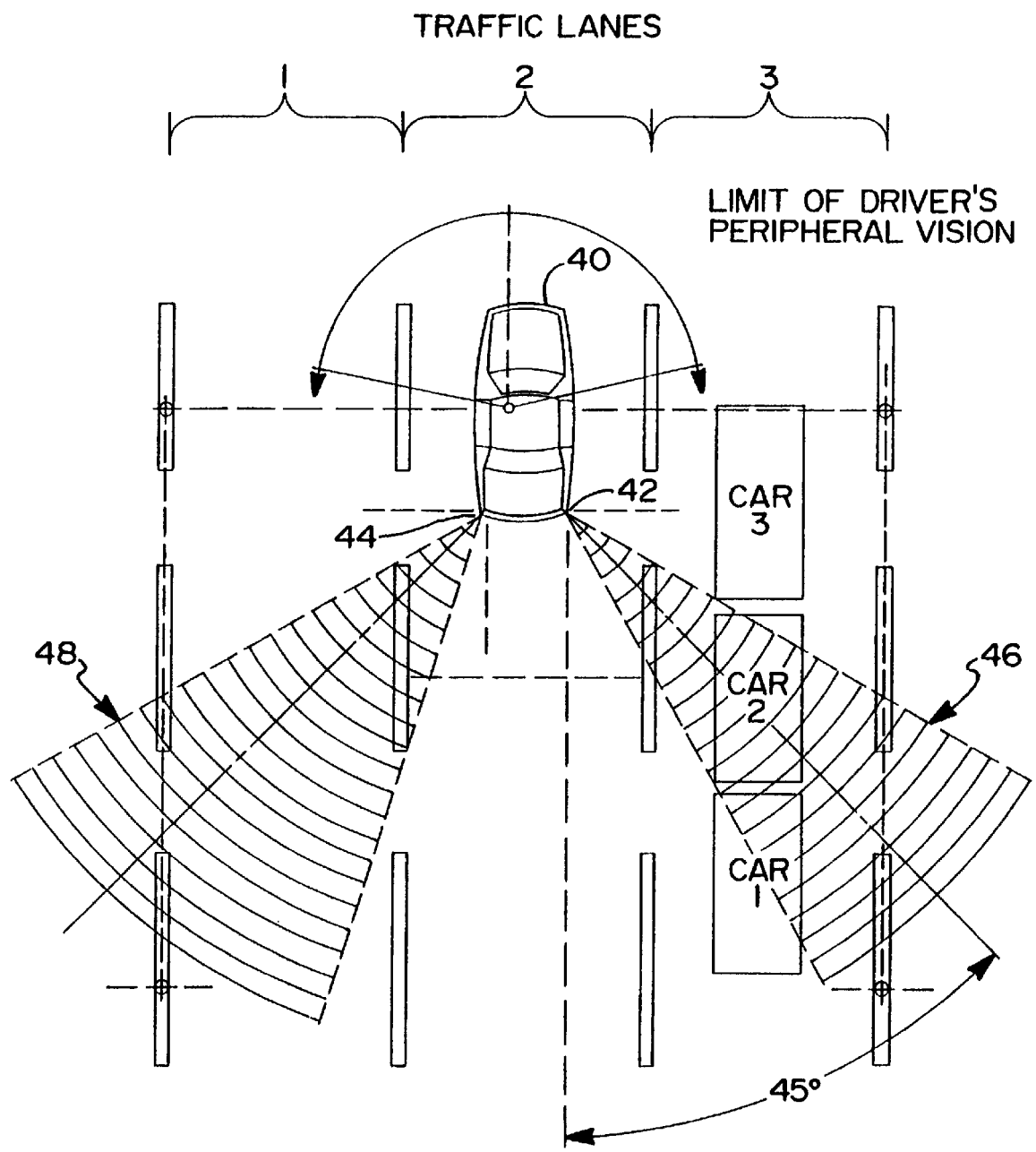
FIG. 7 is schematic plan view of a vehicle on a roadway, depicting zones in space monitored by driver-side and passenger-side blind spot detectors.

FIG. 7 illustrates a vehicle fitted with the detection system of this invention. A vehicle 40 mounts a detector unit in or near its right taillight 42 and at or near its left taillight 44 to monitor rearward zones of space 46 and 48 which are the "blind spots" not observable directly or via mirrors by the vehicle driver. As illustrated, zones 46 and 48 are sized to detect vehicles in the adjacent lanes of traffic which are in the blind spots and, as such, represent a danger should the driver change lanes.

The blind spot is meant to cover adjacent traffic lanes only, and not include roadside objects, such as signs, fences, walls, etc. This blind spot will vary with vehicle type and road conditions. For example, the blind spot should shrink when traversing narrow, winding roads, and will differ for different vehicle types, such as trucks, cars, convertibles with the top up, etc.

Figure 8:
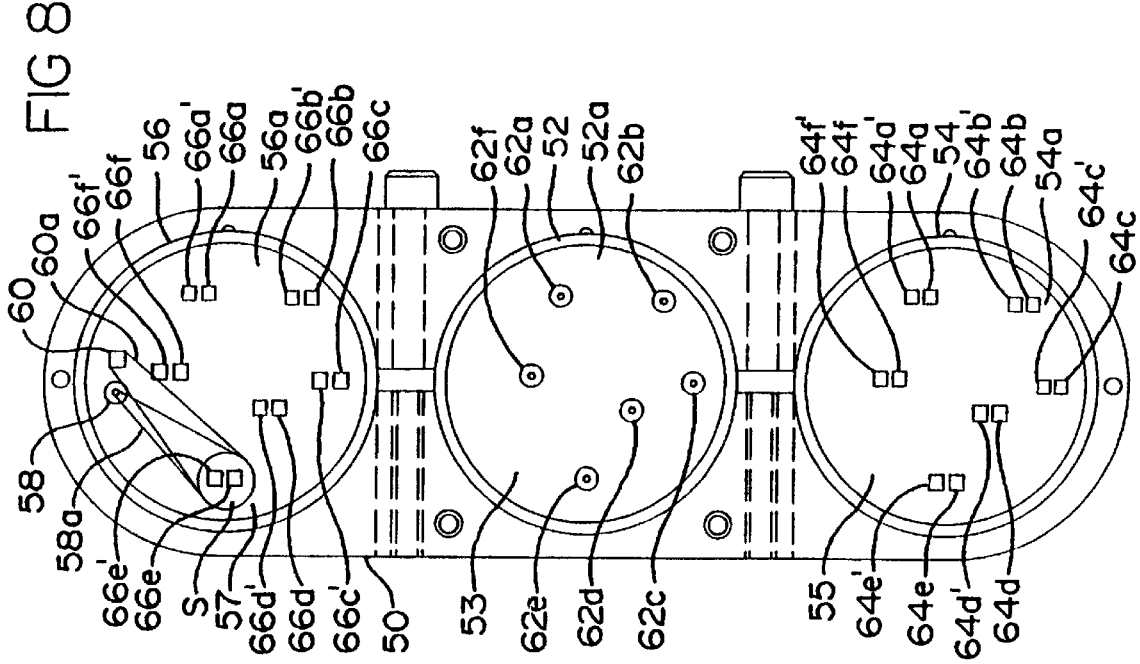
FIG. 8 is an enlarged plan view of a module of a blind spot detector according to this invention.
Figure 9:
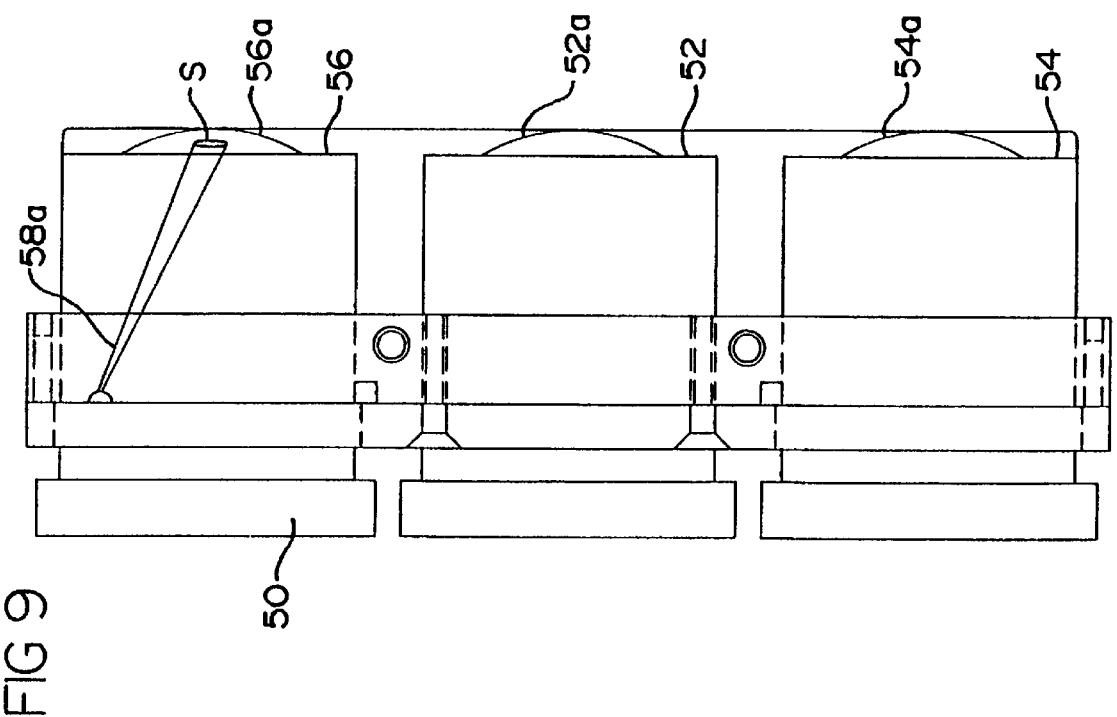
FIG. 9 is a side view of the module of FIG. 8.

A detector module 50 is shown in FIGS. 8 and 9. For most automobiles, the driver side detector unit includes two such modules 50, while the passenger side includes one such module 50, to accommodate different size blind spots. Each module 50 includes a central emitter unit 52 and end detector units 54 and 56, each covered by a clear lens 52a, 54a and 56a.

Unit 52 mounts six emitter LEDs 62a, b, c, d, e and f on a base 53. Detector unit 54 mounts six pairs of positive and negative signal producing photodiode detectors, denotes 64a & a', b & b', c & c', d & d', e & e' and f & f', on a base 55. Detector unit 56 similarly mounts six pairs of positive and negative signal producing photodiode detectors, denoted 66a & a', b & b', c & c', d & d', e & e' and f & f', on a base 57. In addition, base 57 mounts a special purpose LED 58 and photodiodes 60 and 61.

The LEDs 62a–f are carefully mounted on base 53 to aim each of their emitted light energy beams into a unique portion of the monitored zone. This is fully illustrated in U.S. Pat. No. 5,675,326 (incorporated herein by reference), which also discloses the method used to select these unique portions of the monitored zone. The photodiode pairs 64a, a'–f, f' are each mounted on base 55 to monitor (i.e. have a view that includes) one of the beams emitted by LEDs 62a–f. Thus, any portion of the monitored light energy beam which is reflected by objects, such as vehicles, in the monitored zone is received by the monitoring photodiode pair.

Similarly, the photodiode pairs 66a, a'–f, f' are each mounted on base 57 to monitor one of the beams 62a–f. Again, any portion of the monitored light energy beam which is reflected by vehicles in the monitored zone is received by the monitoring photodiode pair. Thus, reflections from one of the light beams emitted from emitter unit 52 are received by a photodiode pair in each of detector units 54 and 56.

Older detector systems, such as illustrated in the aforementioned U.S. Pat. No. 5,463,384, were troubled by problems of false detects caused by nonuniform reflective objects (also termed targets) beyond the monitored zone. The triangulation provided by the use of opposed pairs of detectors which monitor the same emitter beam dramatically reduces these false detects.

As shown in FIG. 16, a base 70 mounts an emitter LED 72 and opposed pairs of positive and negative photodiode pairs 74a, 74b and 76a, 76b. Note that the polarity of the signals produced by photodiodes 74b and 76b closest to LED 72 are both negative (−), while the polarity of those photodiodes farthest from LED 72 are both positive (+). If a target (or object) beyond the boundary of the monitored zone reflects light energy from the beam emitted from LED 72, it will produce light images 78 and 78' on respective photodiode pairs 74a, 74b and 76a, 76b. Since the images fall more on the inner photodiodes 74a and 76b the output signals are of negative polarity and producing no detect signal. If a nonuniform reflecting target located beyond the monitored zone boundary is detected, there will be a nonuniformity of brightness at the tops or bottoms of the spots 78, 78'. The resulting output signals will be (+) and (−), canceling each other out to produce no detect signal.

In the prior art system as illustrated in the aforementioned U.S. Pat. No. 5,463,384, the output of all photodiode pairs were immediately summed into a composite output signal. If any emitter/detector unit were slightly misaligned in manufacturing so that their actual detection boundaries were short of or beyond the desired boundary, false detects could occur. To prevent this, very exacting and precise manufacturing techniques were required to assure conformance with very tight tolerances on very small components (e.g. the units of module 50, each mounting 6 emitters or detector pairs) are each only 1.5" (38 mm) in diameter on 2.0" (51 mm) centers. The photodiodes are each 0.080" square and were to be mounted relative to their emitters within ±0.002" tolerance.

Figure 10:
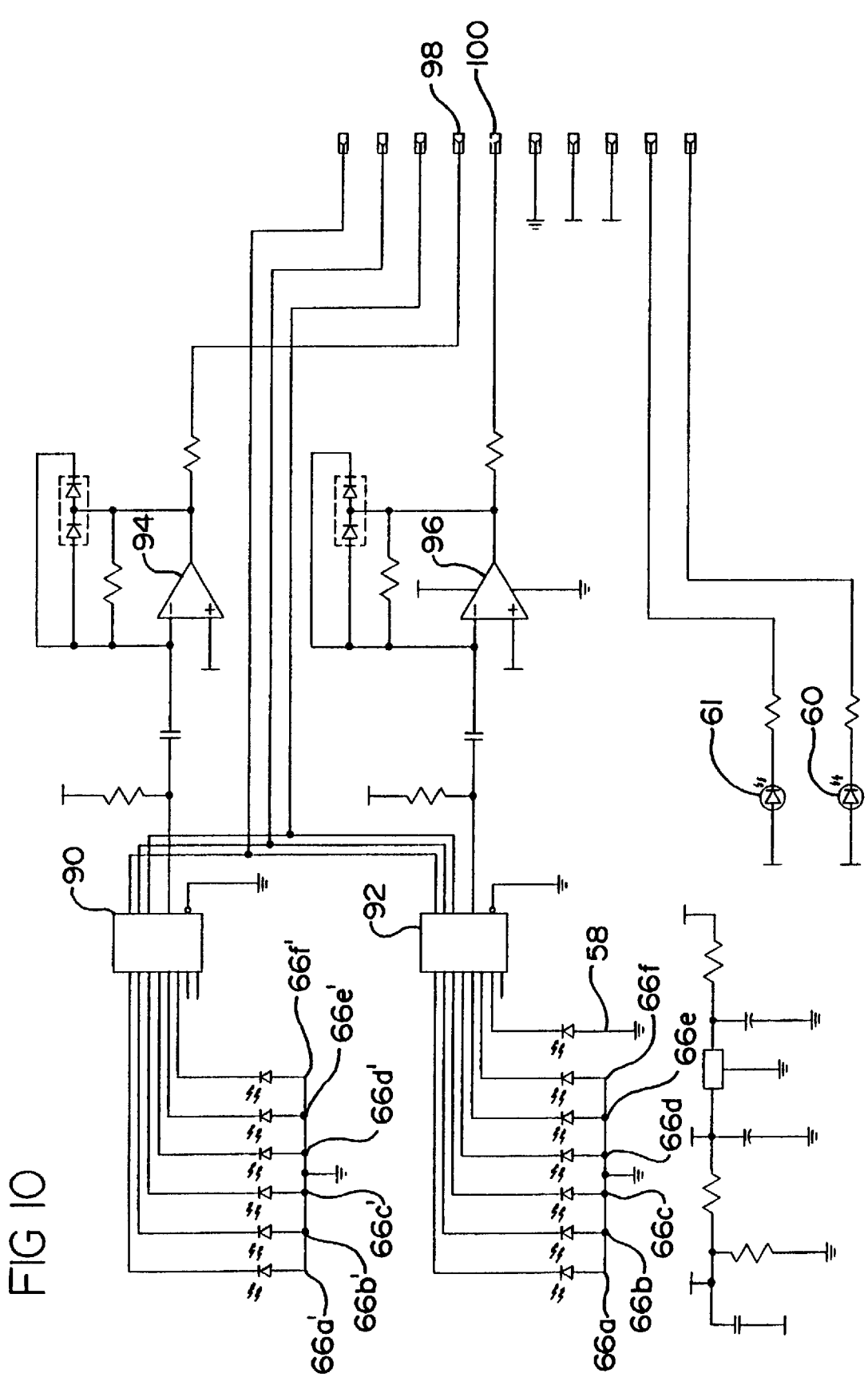
FIG. 10 is the multi-beam receiver portion of a schematic circuit diagram of the blind spot detector of this invention.

This invention provides a means for enabling loosening of tolerances and overcoming manufacturing misalignments by providing electronic adjustment of each emitter/detector unit to produce a predetermined detection boundary. FIG. 10 depicts the electrical circuit for the detector unit 56 portion of module 50. The other detector unit 54 would have identical circuitry, plus include the power circuitry.

FIG. 11 illustrates circuitry for processing the light detection signals produced by detector units 54 and 56.

Light energy received by photodiodes 66a'–f' produces output signals that are transmitted to a demultiplexer 90, while output signals from photodiodes 66a–f are transmitted to demultiplexer 92. The outputs from demultiplexers 90 and 92 are sent to amplifiers 94 and 96, respectively. The positive and negative output signals from amplifiers 94 and 96 are indicated at 98 and 100, respectively, on both FIGS. 10 and 11.

The signals from detector unit 54 are processed by similarly circuitry, with their positive and negative outputs indicated at 102 and 104, respectively. The negative signals 98, 102 are combined and fed into an amplifier 106. The positive signals 100, 104 are combined and fed into an 8-bit serial D.A.C. (Digital to Analog Converter) 108. This circuitry thus treats the positive signals differently than the negative signals.

The use of D.A.C. 108 provides a multiplying coefficient for the positive analog output signal 110 of from 0 to 255, where 255 represents unity gain through D.A.C. 108. The negative signal 112 output from amplifier 106 has an amplification factor or gain of 50% due to the presence of resistor 114 and feedback resistor 116. D.A.C. 108 is controlled by microprocessor 120 via lines 122, 124 under the supervision of EEPROM 126. Thus, D.A.C. provides a positive output signal 110 that is selectively variable in relationship to the negative output signal 112 from amplifier 106.

To obtain gain balance for signals 110 and 112, this variable gain imposed on the positive signal must be 50%, which translates to a value of 127.5 of D.A.C. 108. Signal 110 is amplified by amplifier 128 and combined with signal 112 in amplifier 130. Note that in the prior art systems the positive and negative signals were combined at the photodiodes. Here, however, this delayed combining of the positive and negative signals from the photodiodes enables varying the strength relationship of the positive and negative signals.

A detection system is designed with an LED and photodetector geometry that will provide a predetermined cutoff distance for each detection unit to define the boundaries of a predetermined monitored zone. Any object detected closer than the boundary distance will produce a net positive signal, resulting in a detect. Objects detected beyond the boundary distance will produce a net negative signal, resulting in no detect. Objects detected at the monitored zone boundary will produce equal positive and negative signal components which null out. Since the system is designed to produce a detect signal only on receiving a net positive signal, nulling of both signals when combined results in no detect signal.

FIGS. 17 and 18 illustrate a single exemplary photodiode pair 140, 142. In this detection system, each LED and its associated photodiodes are mounted so that the beam and fields of view are angled to produce a received image I that is balanced and falls equally on both photodiodes 140, 142, as shown in FIG. 17, at the predetermined boundary distance. However, manufacturing variances of mere thousandths (or millimeters) of an inch may result in the manufacture of a unit having a geometrical LED to photodiode relationship that produces a skewed image I for an object detected at the boundary, as shown in FIG. 18. Since image I falls more on the negative photodiode 142, a net negative signal would be produced, which is indicative of detection of an object beyond the monitored zone boundary.

Thus, with this slight geometry error, the detection system will not produce a detect signal for objects detected between the boundary distance and a closer distance which produces FIG. 17 balanced image I. This is a highly undesirable condition. The opposite condition could also occur if the mechanical error produces the opposite geometric error. This would produce a condition in which the image I would fall more on the positive photodiode 140 for an object detected at the boundary. This would produce the FIG. 17 balanced image I for detects at distances between the boundary and a greater distance. This is equally undesirable.

This invention provides a means for electronically correcting any mechanical geometry error by varying the gain of positive signal 110 in relation to the gain of negative signal 112. This is accomplished by programming D.A.C. 108 to increase or decrease the gain of signal 110 until it equals the fixed gain of signal 112 at the boundary distance. In this manner, accurate calibration of all detection systems can be accomplished, despite manufacturing variances.

To accomplish this, a hand-held calibration control unit 150 is provided, having an output 152 that connects via the serial data lines 154 and 156 to microcontroller 120. Unit 150 includes a rotary switch 158 that has discrete positions indicated by numbers, a pair of actuating push buttons 160 and 162, and a series of indicator LEDs 164. Each of the position numbers corresponds to a photodiode pair or the special photodetectors.

Microcontroller 120 is programmed to cause D.A.C. 108 to sequentially increase the gain of signal 110, beginning with 0, as a the LED of the selected LED-photodiode unit is repeatedly pulsed. The gain is incremented until reflections of the pulsed light energy cause the system to issue detect signals via line 170 to microcontroller 120. The detect signals are then counted until the counter reaches some value, such as 5, whereupon microcontroller 120 recognizes that the threshold distance has been reached. When this occurs, the D.A.C. 108 gain value setting for the selected LED-photodiode unit is stored in EEPROM 126. This is a process which electronically begins with a threshold at 0 distance from the detector and moves out until the target is detected, then sets that distance electronically in EEPROM 126.

To calibrate module 50, a target is set at the exact boundary cutoff distance from the detection module. A position number is selected with rotary switch 158 and push button 160 is pressed to cause calibration control unit 150 to instruct microcontroller 120 to begin calibration of the selected LED-photodiode unit. When a nulling gain value for signal 110 is reached, the calibration data is stored in EEPROM 126 for that selected LED-photodiode unit. This procedure is then repeated for each of the LED-photodiode units by positioning the target, sequentially selecting each of the position numbers with rotary switch 158, and pressing button 160.

Thereafter, when the detection system is mounted on a vehicle and activated, the calibration data for each LED-photodiode unit is read from EEPROM 126 and sent to D.A.C. 108. If circumstances dictate that a different size or shape of monitored zone be used, the above calibration procedure can again be performed, using different target placements.

This calibration procedure enables each LED-photodiode unit to be separately calibrated to eliminate the effect of manufacturing dimensional and geometry variances. It also enables the elimination of any imbalance of photodiode response introduced as a result of photodiode manufacturing variances. The greatest benefits are (1) the reduction of manufacturing cost by allowing loosening of tolerances, (2) the elimination of boundary distance errors, and (3) the ability to selectively vary the boundary distances to suit different conditions.

Referring now to FIGS. 8 and 9, special LED 58 and photodiode 60 are provided to determine when the detection unit 50 has a coating of contaminants, such as dirt or grime, that is so debilitating as to prevent the photodiode pairs 66a, a'–f, f' of the detection system from reliably detecting portions of beams emitted by LEDs 62a–f reflected from objects in the monitored zone. The lenses 52a, 54a and 56a of unit 50 is preferably, but not necessarily, covered by a transparent cover 51 through which the emitted beams and their reflections travel. LED 58 and photodiode 60 are placed so that they monitor the some area of the cover through which the emitted beams and/or the sensed reflections pass. Thus the ability of the emitter/detector pairs to function is directly monitored.

LED 58 is placed in receiver unit 50 so as to project its beam 58a at a compound angle to the vertical. Viewing FIG. 8, LED is at a 9 o'clock position and beam 58a is displaced rightward and downward impinge on lens 56a at a spot S located at a 6 o'clock position. Photodiode 60 is similarly angled so that its field of view 60a intersects beam 58a at spot S, located within the area of lens 56a through which reflected beams are sensed by the photodiode pairs 66a, a'–f, f'.

If beam 58a were located so as to impinge on lens 56a at a point where it is perpendicular or nearly perpendicular to the front or back surface of lens 56a, beam 58a would produce backscatter that would be detected by photosensor 60. This would falsely indicate a debilitating lens coating. However, when located as in FIGS. 8 and 9, beam 58a is not perpendicular to either the front surface or back surface of lens 56a, so that beam 58a will pass through a clean lens 56a without backscatter. Thus, any light energy detected by photosensor 60 will be light from beam 58a that is reflected back by dirt coating the outside of lens 56a. Of course, LED 58 and photodiode 60 could be similarly placed in emitter unit 52 or detector unit 54.

FIGS. 13, 14 and 15 depict an element holder 80 for mounting LED 58 and photodiode 60 at the compound angle on base 57. Holder 80 has a flat base 82 and barrels 84 and 86 for mounting LED 58 and photodiode 60. Base 82 is at a compound 17° angle so that, when holder 80 is mounted on base 57, beam 58a and field of view 60a intersect at spot S. Prior art dirty window detectors have been separate units mounted adjacent the actual receiver lens and did not monitor actual dirt conditions on the receiver lens. The dirty window detection arrangement of this invention more accurately determines the condition of the actual receiver lens. Also, since it is integrated interiorly of the detector module, this arrangement facilitates manufacturing and reduces cost.

The LED-photodiode unit calibration method described above is also used to calibrate the operation of the dirty window detection unit comprising special LED 58 and photodiode 60. Since photodiode 60 has a positive polarity, it is subject to gain variation by D.A.C. 108. To calibrate this unit, an open mesh cloth, similar to sheer or scrim curtain material (not illustrated) which is translucent but has a predetermined amount of reflectivity (e.g. 20%), is placed over lens 56a to represent the maximum amount of dirt buildup on the lens that is tolerable. Any greater buildup will decrease translucence sufficiently to inhibit acceptable operation of the detection system in detecting objects in the monitored zone.

Rotary switch 158 is indexed to the proper position. Then, with the cloth in place, push button 160 on control unit 150 is depressed, which cause the calibration operation described above. LED 58 will be sequentially pulsed as the gain is incremented until a value is reached which causes detect signals to be counted. This threshold gain value is stored in EEPROM 126 for use when the dirty window detection unit is operated. This procedure accommodates use of LEDs having differing strengths and variations in photodiodes. Photodiode 61 is provided to conduct an "on" test, as more fully described in the aforementioned U.S. Pat. No. 5,463,384.

While only preferred embodiments of this invention have been illustrated and described, obvious modifications thereof are contemplated within the scope of the following claims.

I claim:

1. An electro-optical detection system for detecting objects within the boundaries of a monitored zone, comprising a plurality of emitter and photodetector pairs, each comprising an emitter for emitting a beam of pulses of light energy into the monitored zone, and a photodetector for detecting light energy including light energy from each of the beam pulses that is reflected from an object within the monitored zone and for generating light detection signals, and a controller for operating the emitter and photodetector pair and for evaluating the light detection signals to discriminate between a valid signal, comprising light energy of a beam pulse which is reflected from an object within the monitored zone, and invalid signals comprising other light energy, and which produces an object detection signal, including programmable range adjustment means for each of the emitter and photodetector pairs which selectively adjusts the evaluation of the light detection signals to adjust the effective boundaries of the monitored zone.

2. The detection system of claim 1, wherein the emitters are infrared LEDs and the photodetectors each comprise a pair of opposite-polarity photodiodes, each monitoring a unique portion of the monitored zone.

3. The detection system of claim 1, further including
a bandwidth-limiting receiver subject to noise,
a zero threshold detector for evaluating the combined noise and pulse response of the bandwidth-limited receiver at one or more spaced points in time which correspond with predetermined points in time when positive or negative peak voltage responses from reflected beam pulses are expected,
an up/down counter employed to count up only if the detector reports the correct polarity of the expected responses, and to count down for all other responses, the up/down counter being heavily biased to count down in the presence of noise only,
whereby the false object detection signal rate in the absence of a valid signal decreases exponentially with the length of the counter.

4. The detection system of claim 1, further including
a bandwidth-limited receiver subject to noise,
a multi-test zero threshold detector for evaluating the combined noise and pulse response of the bandwidth-limited receiver at two or more spaced points in time which correspond with points in time when predetermined maximum and minimum voltage peak and flyback responses of opposite polarity from reflected beam pulses are expected,
an up/down counter employed to count up only if the detector reports the polarity and sequence of the responses expected from a reflected beam pulse, and to count down for all other responses, the up/down counter being inherently biased to count down in the presence of noise only,
whereby the false detection rate in the absence of a valid object detection signal decreases exponentially with the length of the counter.

5. The detection system of claim 1, wherein light sensed by the photodetectors pass through a transparent cover in a predetermined area, and further including
cover transparency evaluating means including a special emitter for emitting a special beam of light energy at an angle that assures transmission through the cover at a predetermined spot within the predetermined area,
a special photodetector aimed at the spot to receive light energy reflected from the special beam by contaminants on the cover which reduce cover transparency and to generate a contaminant detection signal to the controller when a predetermined level of reflected light energy is detected, and adjustment means for to selectively vary the amplification of the contaminant detection signal.

6. An electro-optical detection system for detecting objects within a monitored zone, including
an emitter for emitting a beam of pulses of light energy into the monitored zone,
a photodetector for detecting light energy including light energy from the beam pulses that is reflected from an object within the monitored zone and for generating light detection signals, and
a controller for operating the emitter and photodetector and for evaluating the light detection signals to discriminate between valid signals comprising light energy of the beam pulses which is reflected from an object within the monitored zone and invalid signals comprising other light energy, and which produces an object detection signal, including a bandwidth-limited receiver subject to noise, and a zero threshold detector for evaluating the combined noise and pulse response of the bandwidth-limited receiver at one or more spaced points in time which correspond with predetermined points in time when positive or negative peak voltage responses from reflected beam pulses are expected,
an up/down counter employed to count up only if the detector reports the correct polarity of the expected responses, and to count down for all other responses, the up/down counter being biased to count down in the presence of noise only,
whereby the false object detection signal rate in the absence of a valid object detection signal decreases exponentially with the length of the counter.

7. The detection system of claim 6, wherein the up/down counter counts up one unit for a polarity response expected from a reflected beam pulse and counts down more than one unit for all other responses, whereby an increase in the ratio of the down to up count decreases the probability of producing a false object detection signal.

8. The detection system of claim 7, wherein the down to up count ratio of the up/down counter is 3:1.

9. The detection system of claim 6, wherein the zero threshold detector evaluates the combined noise and pulse response of the bandwidth-limited receiver at two or more spaced points in time which to correspond with points in time when predetermined maximum and minimum voltage peak and flyback responses of opposite polarity from reflected beam pulses are expected, and
the up/down counter counts up only if the detector reports the polarity and sequence of the peak and flyback responses expected from a reflected beam pulse, and counts down for all other responses, the up/down counter being inherently biased to count down in the presence of noise only,
whereby the false detection rate in the absence of a valid object detection signal decreases exponentially with the length of the counter.

10. The detection system of claim 6, wherein light sensed by the photodetectors pass through a transparent cover in a predetermined area, and further including
cover transparency evaluating means including a special emitter for emitting a special beam of light energy at an angle that assures transmission through the cover at a predetermined spot within the predetermined area,
a special photodetector aimed at the spot to receive light energy reflected from the special beam by contaminants on the cover which reduce cover transparency and to generate a contaminant detection signal to the controller when a predetermined level of reflected light energy is detected, and adjustment means for to selectively vary the amplification of the contaminant detection signal.

* * * * *